United States Patent [19]
Kelley et al.

[11] Patent Number: 5,365,803
[45] Date of Patent: Nov. 22, 1994

[54] STEERING AND TRANSMISSION SHIFTING CONTROL DEVICE

[75] Inventors: Craig B. Kelley, Dunlap; David E. Nelson, Peoria; Peter M. Nelson, Sandwich, all of Ill.

[73] Assignee: Caterpillar Inc., Peoria, Ill.

[21] Appl. No.: 91,146

[22] Filed: Jul. 13, 1993

[51] Int. Cl.$^5$ .......................... B62D 1/04; H01H 9/00; H01H 3/12
[52] U.S. Cl. ................................. 74/484 R; 200/61.57
[58] Field of Search ........................ 74/483 PB, 484 R; 200/61.54, 61.57

[56] References Cited

U.S. PATENT DOCUMENTS

| | | | |
|---|---|---|---|
| 1,315,255 | 9/1919 | Stortz | 74/483 PB X |
| 1,458,421 | 6/1923 | Kesling | 74/483 PB X |
| 1,524,923 | 2/1925 | Forsythe | 74/483 PB X |
| 2,610,518 | 9/1952 | Goedeke et al. | 74/483 PB X |
| 2,827,801 | 3/1958 | Ingolia | 74/484 R X |
| 3,142,227 | 7/1964 | Stringer | 89/136 |
| 3,811,336 | 5/1974 | Pulskamp | 74/471 XY |
| 3,867,600 | 2/1975 | Phillips | 200/157 |
| 3,937,294 | 2/1976 | Haddock | 180/77 R |
| 3,940,674 | 2/1976 | Gill | 318/589 |
| 4,012,014 | 3/1977 | Marshall | 244/83 F |
| 4,216,467 | 8/1980 | Colston | 340/365 L |
| 4,380,938 | 4/1983 | Olson | 74/473 R |
| 4,533,899 | 8/1985 | Isaksson | 338/128 |
| 4,541,497 | 9/1985 | Riediger et al. | 180/6.48 |
| 4,574,651 | 3/1986 | Nordstrom | 74/471 XY |
| 4,700,802 | 10/1987 | Fought | 180/324 |
| 4,728,923 | 3/1988 | Finger | 74/484 R X |
| 4,798,099 | 1/1989 | Alexander et al. | 74/473 R |
| 4,896,558 | 1/1990 | Meier et al. | 74/543 |

FOREIGN PATENT DOCUMENTS

| | | | |
|---|---|---|---|
| 3018247 | 11/1981 | Germany | 74/484 R |
| 4-356272 | 12/1992 | Japan | 74/484 R |

OTHER PUBLICATIONS

Exhibit A-Literature from RMH Control AB, Stockholm Sweden, Circa 1988/89.
Exhibit B-Literature from Volvo BM, (associated with VME Industries, Sweden AB) Circa 1988.
Exhibit C-Annotated Literature on a Control Offered by Liebherr International AG, of Switzerland, or related subsidiary (Circa 1988/89.
Exhibit D-Photograph of a control handle offered by Engstrom Nilson Maskin AB of Sweden and/or Engson of Sweden (Circa 1988).
Exhibit E-Literature on a Liebherr-America, Inc. "Litronic" Excavator (Circa 1988/89).
Exhibit F-Literature form Cyber-Tech, Inc. of Portland, Oregon; on a Saw-Handle Control (Circa Oct., 1988).
SAE Technical Paper "New Technology for Powershift Transmissions in Hydrostatik Driven Wheel Excavators and Wheel Loaders" by E. Mann Sep. 10-13, 1990.

*Primary Examiner*—Allan D. Herrmann
*Attorney, Agent, or Firm*—Diana L. Charlton

[57] ABSTRACT

The design and manufacture of past steering and transmission shifting control devices utilized an upright and rockable control handle for the steering function and an actuating element in close association with the control handle for effecting a speed change function of a multi-speed transmission. The design of the control handle does not offer a rotatable steering member which is familiar and easy to operate. The present invention overcomes these problems by providing a steering wheel for steering a vehicle. A means for changing the speed ratio of the transmission is mounted on a front portion of the steering wheel and extends from a front surface so that the changing means may be conveniently accessed by an operator. A means for selecting either the forward or reverse drive condition of the transmission is mounted on the back portion of the steering wheel and extends from the back surface so that the selecting means may be conveniently accessed by the operator. The use of the steering wheel results in a convenient and simple steering and transmission shifting control device.

3 Claims, 1 Drawing Sheet

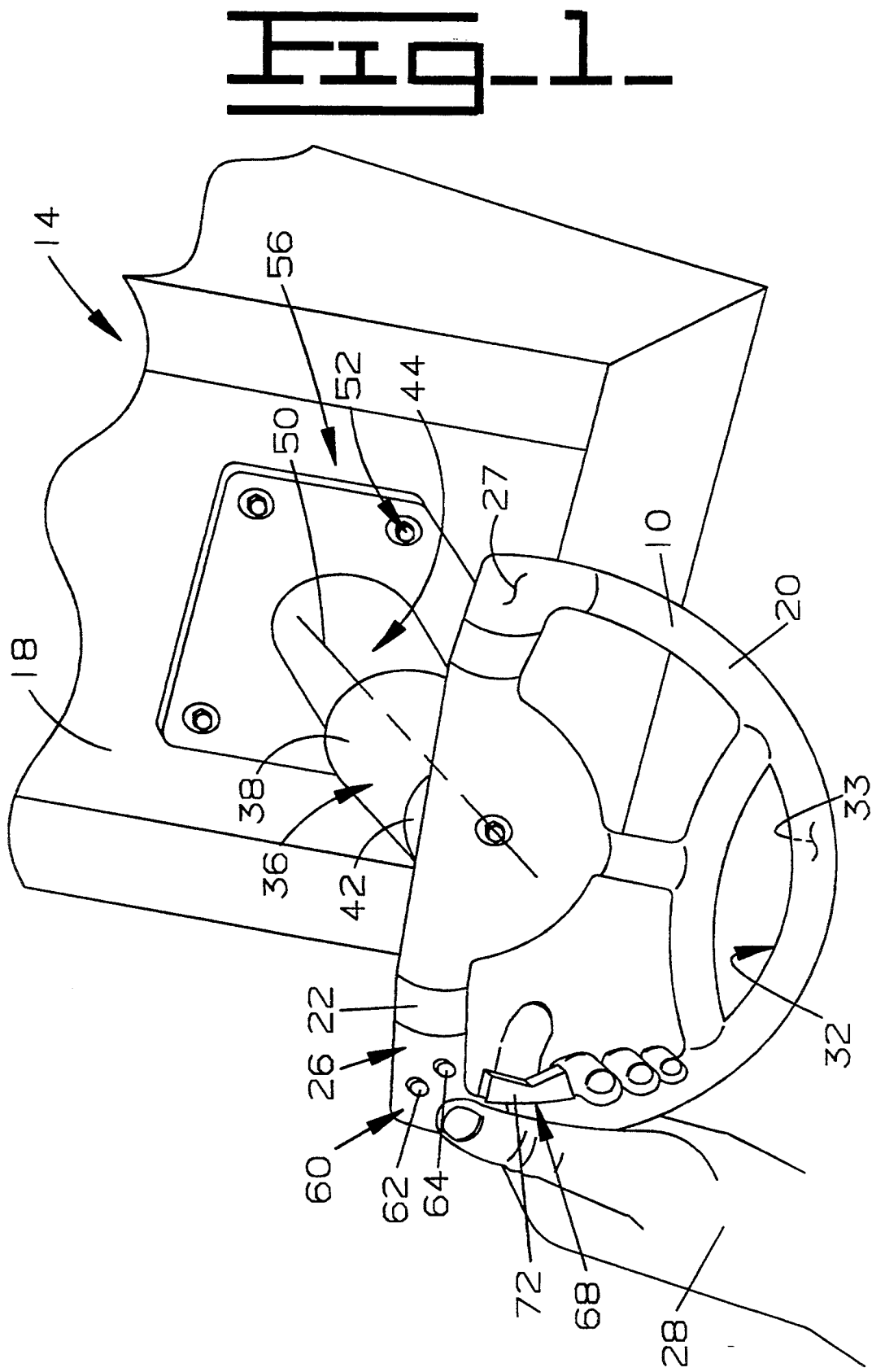
Fig_1

5,365,803

STEERING AND TRANSMISSION SHIFTING CONTROL DEVICE

DESCRIPTION

1. Technical Field

This invention relates generally to a steering and transmission shifting control mechanism and more particularly to the control mechanism being conveniently positioned on a rotatable steering member.

2. Background Art

An example of a prior art steering and transmission control mechanism is disclosed in U.S. Pat. No. 5,042,314 issued to Noel J. Rytter et. al. on Aug. 27, 1991. The goal of the control mechanism was to provide a simple, yet rugged and economical steering and transmission shifting control mechanism for operating a vehicle that utilizes an upright and rockable control handle for the steering function in cooperation with an actuating element in close association with the control handle for effecting a speed change function of a multi-speed transmission. However, the upright and rockable control handle does not offer a steering and transmission shifting control device conveniently located on a familiar rotatable steering member which is easily operated.

The present invention is directed to overcoming one or more of the problems as set forth above.

DISCLOSURE OF THE INVENTION

In one aspect of the present invention a steering and transmission shifting control mechanism is provided for operating a vehicle. The vehicle has a reversible multi-speed transmission for moving the vehicle in forward and reverse directions at different speed ratios. The control mechanism comprises a steering member which has a front portion defining a front surface facing an operator and a back portion defining a back surface facing away from the operator A support means is included which mounts the steering member on the vehicle for rotatable movement by movement of an operator's hand. The control mechanism includes a means responsive to the rotatable movement of the steering member for steering the vehicle, a means for changing the speed ratio of the transmission of the vehicle, and a means for selecting either the forward or reverse drive condition of the transmission of the vehicle. The means for changing the speed ratio of the transmission includes at least one control button which is mounted on the front portion of the steering member and extends from the front surface so that the control button may be conveniently accessed by the operator. The means for selecting includes a control switch which is mounted on the back portion of the steering member and extends from the back surface so that the control switch may be conveniently accessed by the operator.

The disadvantage of the prior art is that they fail to provide a steering and transmission shifting control device which is a familiar and conveniently located on a rotatable steering member for ease of operation.

BRIEF DESCRIPTION OF THE DRAWINGS

FIG. 1 is a diagrammatic perspective view of an embodiment of the present invention.

BEST MODE FOR CARRYING OUT THE INVENTION

Referring to FIGS. 1 and 2, a steering member 10, hereinafter referred to as a steering wheel, of a steering and transmission shifting control device 14 for a vehicle 18 having a multi-speed transmission (not shown) is shown immediately forwardly of an operator's seat (not shown). The steering wheel 10 has a semi-circular, substantially U-shaped hollow outer member 20 and a transverse intermediate hollow bar 22 integrally formed with the outer member 20 to close the substantially U-shaped configuration. The steering wheel 10 has a front portion 26 defining a front surface 27 facing an operator 28 and a back portion 32 defining a back surface 33 facing away from the operator 28.

The control device 14 includes support means 36 for mounting the steering wheel 10 to the vehicle 18 for rotatable movement. The support means 36 includes a substantially hollow steering column 38 which has a forward portion 42 and a base portion 44. A shaft (not shown) is located within the support means 36 and is rotatably mounted to the intermediate bar 22 through an axis 50 formed conjointly by the connection between the steering wheel 10 and the steering column 38 so that the forward portion 42 is in abutment with the steering wheel 10. The base portion 44 is securely fastened to the vehicle 18 by a plurality of bolts 52. A means 56 responsive to the rotatable movement of the steering wheel 10 for steering the vehicle 18 is connected to the steering wheel 10 in any suitable manner. The steering means 56 may be of any conventional design, such as a mechanical gear box or hydraulically activated motor, or any suitable means for steering the vehicle 18.

The control device 14 includes means 60 for changing the speed of a conventional, reversible, multi-speed transmission (not shown) powering the vehicle 18. The changing means 60 includes first and second control buttons 62,64, respectively, which are electrical switches mounted on the front portion 26 of the left side of the steering wheel 10. The control buttons 62,64 are positioned on the intermediate bar 22 and extend from the front surface 27 so that when gripping the steering wheel 10 an operator's thumb can easily access them. The first control button 62 is effective to upshift the transmission gear speed ratios between a plurality of gears. The second control button 64 is effective to downshift the transmission between the plurality of gears.

The control device 14 includes means 68 for selecting the direction of the longitudinal travel of the vehicle 18. The selecting means 68 includes a movable control trigger 72 which is mounted on the back portion 32 of the left side of the steering wheel 10. The control trigger 72 is positioned on the outer member 20 and extends from the back surface 33 so that when gripping the steering wheel 10 an operator's finger can easily access it. The control trigger 72 is a three-position switch which is movably selectable between a forward, neutral, or reverse drive condition of the transmission (not shown).

The changing means 60 and the selecting means 68 are conventionally connected to a control system (not shown), such as an electronic transmission control or a microprocessor, to actuate conventional two directional clutch solenoids (not shown) and speed clutch solenoids (not shown) of the transmission (not shown).

INDUSTRIAL APPLICABILITY

In use, the fingers of the left hand of the operator 28 can easily grasp the steering wheel 10 by generally surrounding the outer member 20 as is clearly illustrated in FIG. 1. With the operator's left hand in that position, the vehicle 18 can be steered to the left or to the right by rotating the steering wheel 10 about the axis 50. The rotational movement of the steering wheel 10 actuates the 10 steering means 56, initiating a left or right turn of the vehicle 18 in a conventional manner. Simultaneously, the operator can manually change the operating speed of the transmission (not shown) by generally depressing the control buttons 62,64. Normally, the left thumb of the operator 28 will rest against the intermediate bar 22 in close proximity to the control buttons 62,64. Depressing the first control button 62 will upshift the transmission from the first gear ratio position to the second gear ratio position. Further subsequent depressions of the first control button 62 will result in either the third gear ratio position or the fourth gear ratio position, which are associated with high ground speed travelling modes. Depressing the second control button 64 will downshift the transmission from the current gear ratio position to a lower gear ratio position. Suitable circuitry (not shown) in the control system (not shown) will actuate the transmission solenoids (not shown) for the desired speed or gear ratio.

At the same time, the left index finger of the operator 28 can be urged rearwardly against the upper part of the control trigger 72 to cause the reverse directional solenoid (not shown) to actuate in a manner substantially as that mentioned above. Likewise, rearward movement of the left index finger on the lower part of the control trigger 72 will cause the forward directional solenoid (not shown) to actuate in a similar manner as the reverse directional solenoid (not shown). When the left index finger positions the control trigger 72 in a centered position, it effectively cuts off any electrical signal to the directional solenoids (not shown) to place the vehicle (18) in neutral.

In view of the above, it is apparent that the present invention provides a more conveniently located steering and transmission shifting control device which can be utilized with a controlled range of motion for greater road control.

We claim:

1. A steering and transmission shifting control mechanism for operating a vehicle having a reversible multi-speed transmission for moving the vehicle in forward and reverse directions at different speed ratios, comprising:

a steering wheel having a front portion defining a front surface facing an operator and a back portion defining a back surface facing away from the operator;

support means for mounting the steering wheel on the vehicle for rotatable movement by movement of an operator's hand;

means responsive to the rotatable movement of the steering wheel for steering the vehicle;

means for changing the speed ratio of the transmission of the vehicle including at least one control button mounted on the front portion of the steering wheel and extending from the front surface so that the control button may be conveniently controlled by an operator's thumb; and means for selecting either the forward or reverse drive condition of the transmission including a control trigger, the control trigger being a three-position switch mounted on the back portion of the steering wheel and extending from the back surface so that the control trigger may be conveniently controlled by an operator's finger.

2. The control mechanism of claim 1, wherein the steering wheel has a semi-circular shape and includes an intermediate bar integrally formed therewith to close the semi-circular shape.

3. The control mechanism as in claim 1, wherein the control button and the control trigger are positioned on the left side of the steering wheel so that the control button and the control trigger may be controlled by an operator's left hand.

* * * * *